United States Patent [19]

Vescio et al.

[11] Patent Number: 4,703,400
[45] Date of Patent: Oct. 27, 1987

[54] SHOCK RESISTANT VEHICULAR LAMP

[75] Inventors: Donald W. Vescio, Fulton; Daniel S. Latham, North Syracuse, both of N.Y.

[73] Assignee: R. E. Dietz Co., Syracuse, N.Y.

[21] Appl. No.: 888,744

[22] Filed: Jul. 24, 1986

[51] Int. Cl.⁴ .............................................. B60Q 1/00
[52] U.S. Cl. ...................................... 362/80; 362/369; 362/226; 248/27.3
[58] Field of Search .................... 362/267, 369, 80, 83, 362/61, 368, 374, 390, 455, 365, 226; 340/87, 97, 84, 100, 89; 248/27.3; D26/36

[56] References Cited

U.S. PATENT DOCUMENTS

| 2,207,507 | 7/1940 | Douglas | 248/27.3 |
| 2,903,570 | 9/1959 | Worden | 248/27.3 |
| 3,017,501 | 1/1962 | Tantlinger | D26/36 |
| 3,794,278 | 2/1974 | Frey, Jr. et al. | 248/27.3 |
| 4,488,206 | 12/1984 | Mizusawa | 362/80 |

FOREIGN PATENT DOCUMENTS 2001708 10/1970 Fed. Rep. of Germany ...... 362/226

Primary Examiner—William A. Cuchlinski, Jr.
Assistant Examiner—D. M. Cox
Attorney, Agent, or Firm—Bruns and Wall

[57] ABSTRACT

A vehicular lamp having a one piece open topped resilient housing containing an outer peripheral groove that permits the housing to be snapped into a receiving opening formed in a body panel of a vehicle. The housing further includes an inner peripheral groove located above the outer groove into which a lens is snap fitted to close the housing. The inner groove is offset from the outer groove a sufficient distance so that the lens can be removed and replaced without having to remove the housing from the body panel. An outwardly disposed lip protrudes from the top of the outer groove that is inclined downwardly over the groove opening so that it will form a biased seal against the rim of the panel opening when the lamp is snap-locked in place.

10 Claims, 7 Drawing Figures

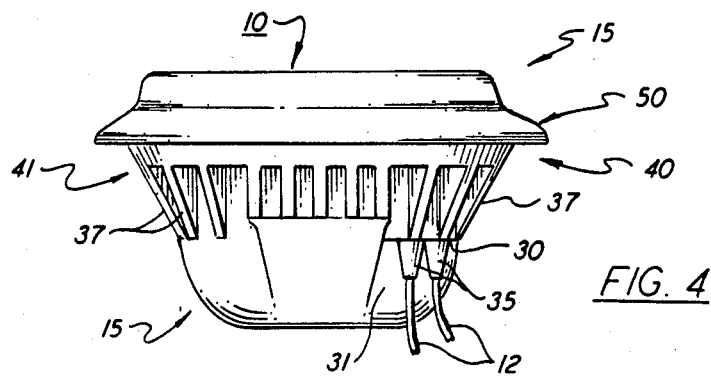
FIG. 4
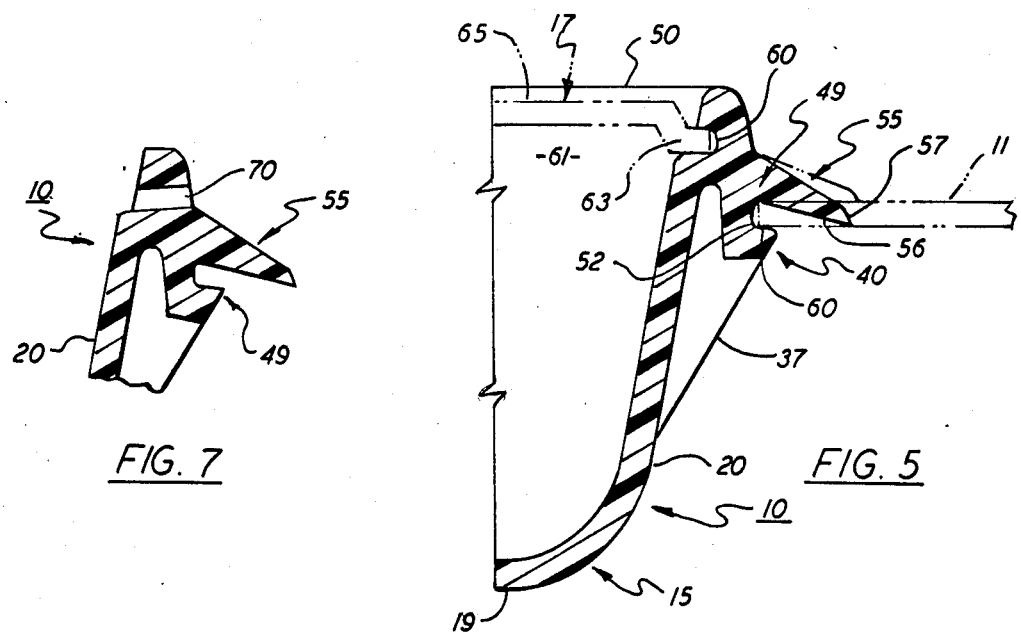
FIG. 7
FIG. 5
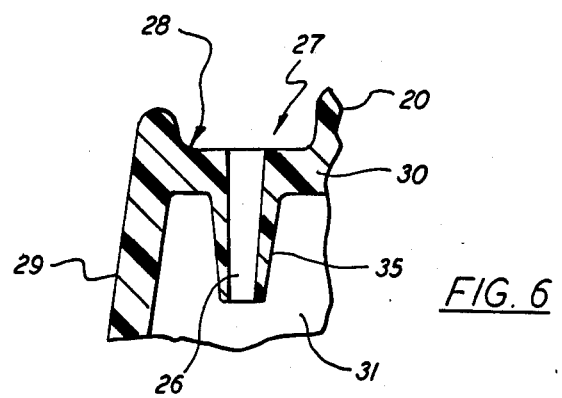
FIG. 6

SHOCK RESISTANT VEHICULAR LAMP

BACKGROUND OF THE INVENTION

This invention relates to a shock resistant automotive lamp that can be snap-locked into a body panel thereby eliminating the need for screws or the like.

It is highly desirous in the automotive industry to develope a tail light or running light unit for use in trucks and trailers that is both self-locking and shock resistant. By eliminating screw holes, clamping brackets and the like which are normally used to secure this type of lamp to the vehicle body, problems associated with rust are avoided and the time of assembly considerably shortened. Similarly, by making the unit shock resistant, the lamp is more effectively shielded from road induced stresses thereby considerably extending the life of the unit and the electrical components contained therein.

One type of shock resistant vehicular lamp that is in present use within the industry involves a sealed unit in which a bulb is contained within a plastic housing and the housing is closed by a lens. The unit is typically mounted within the body panel of a vehicle by means of an overly large rubber groummet. The groummet is snapped into an opening in the auto panel and the lamp unit, in turn, is snapped into the groummet. It has been found however, that the groummet can become worn and/or weakened with age and prolonged usage. As a consequence, the lamp unit can work itself loose, particularly when subjected to relatively high road stresses, and become dislodged from the groummet. When this occurs the lamp can fall from the panel thus damaging either the lamp or the electrical components associated therewith. It should be further noted that because the lamp unit is totally sealed, any failure of the bulb requires that the entire unit be discarded and replaced with a new unit. This practice has proven to be wasteful and expensive.

SUMMARY OF THE INVENTION

It is therefore an object of the present invention to improve lighting units for use in motor vehicles, trailers and the like.

A further object of the present invention is to provide a lamp unit for use in a vehicle that has a deformable shock resistant housing that can be snap-locked into a body panel of the vehicle to form a weather tight joint therebetween.

Yet another object of the present invention is to provide a self-contained shock resistant vehicular lamp unit that snap-locks into a body panel opening and which is capable of forming a weather tight seal with panels of varying thicknesses without having to change or otherwise alter the unit configuration.

Still another object of the present invention is to eliminate the use of heavy adaptor groummets in shock resistant vehicular lamp assemblies.

While a still further object of the present invention is to improve self-locking, shock resistant vehicular lamp units so that the lamp bulbs can be quickly and efficiently changed without having to remove the unit from the vehicle.

Another object of the present invention is to provide a vehicular lamp unit that has a one piece housing molded from a resilient shock resistant material that can be snap-locked into a body panel and which further contains an outwardly disposed deformable lip that automatically engages the panel at closure to form a tight seal thereagainst.

These and other objects of the present invention are attained by means of a vehicular unit lamp that includes a one piece, open topped, housing formed of a resilient rubber-like material that is capable of being snap-locked into an opening formed in a body panel of a vehicle to form a weather-tight seal thereagainst. A lens is removably received within a peripheral groove recessed inside the housing opening so that the lens can be easily removed and replaced by deforming the top of the housing about the opening without having to remove the unit from the body panel.

BRIEF DESCRIPTION OF THE DRAWINGS

For a better understanding of these and other objects of the present invention reference is had to the following detailed description of the invention which is to be read in conjunction with the associated drawings, wherein:

FIG. 4 is an end view of the lamp showing the electrical leads passing into the lamp housing;

FIG. 5 is a further enlarged partial view in section taken along lines 5—5 in FIG. 2;

FIG. 6 is an enlarged partial section taken through the raised electrical lead shelf associated with one of the sidewalls of the lamp housing; and FIG. 7 is an enlarged partial section taken along lines 7—7 in FIG. 2.

DESCRIPTION OF THE INVENTION

Figure 1:
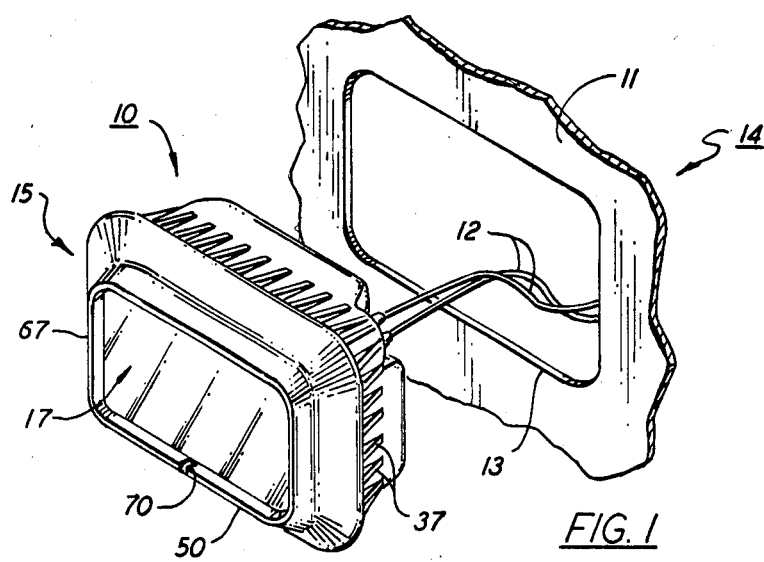
FIG. 1 is an exploded view in perspective of a lamp embodying the teachings of the present invention showing the lamp unit adjacent receiving opening formed in the body panel of a vehicle.

Referring now to the drawings, there is shown in FIG. 1 a lamp unit, generally referenced 10 positioned outside the body panel 11 of a vehicle 14 that requires lighting in order to operate at night or in times of poor visibility. The lamp unit may be used as a warning light, a signal light or a running light depending on its location on the vehicle and the manner by which it is wired to the vehicle's electrical system. Typically, the vehicle will be, but is not restricted to, a motor vehicle or trailer of the type that moves over open roads and highways. As a consequence, the lamp unit is ordinarily exposed to relatively high, road induced, stresses that can damage the lamp or adversely effect the electrical components associated therein. The lamp unit is electrically connected to a suitable source of power via electrical leads 12—12 which pass inside the vehicle through a lamp receiving opening 13 formed in the body panel. The lamp unit includes a housing 15 which, as will be explained in greater detail below, is snap-locked into the panel opening to provide a strong weather-tight seal therebetween. The housing contains an open top which is closed in assembly by the lens 17. The cross-sectional shape of the housing body generally complements that of the panel opening. Although the housing is shown rectangular in form in the drawing, it should become evident from the present disclosure that it can take any suitable shape that might best conform to the contour of the vehicle.

Turning now to FIGS. 2-6, the lamp housing is an open topped structure containing a relatively flat bottom wall 19 and four integral horizontally disposed side walls 20—20 all having the same wall thickness. The housing is preferably molded in one piece from any suitable resilient material, such as that commercially available under the tradename Geon. The material has sufficient body strength and resiliency to absorb road induced stress that are transmitted to the unit through the body panel.

Figure 2:
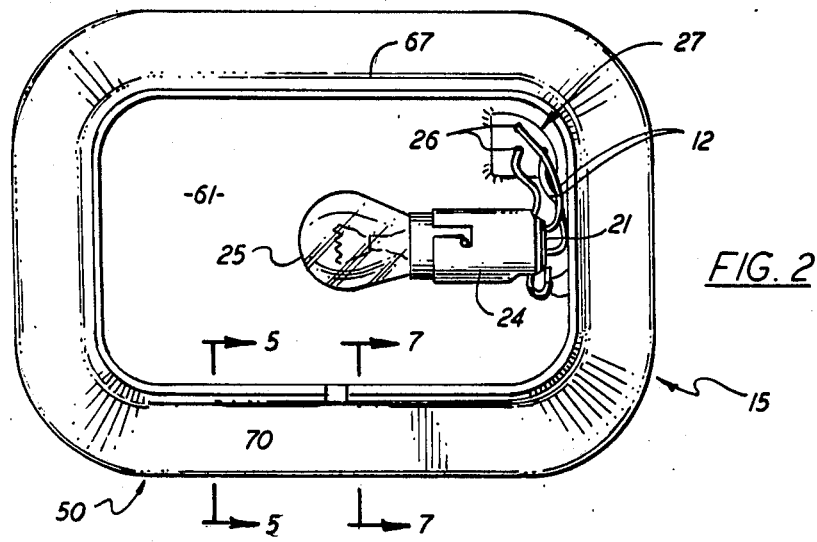
FIG. 2 is an enlarged top plan view of the lamp illustrated in FIG. 1.
Figure 3:
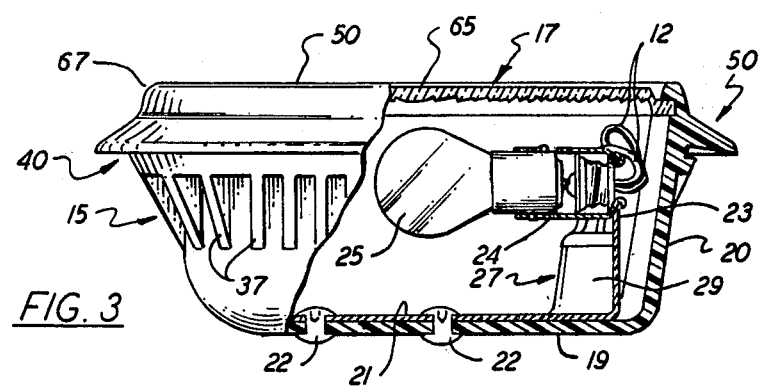
FIG. 3 is a side elevation of the lamp shown in FIG. 1 with portions broken away to show the bulb and bracket assembly contained therein.

A metal bracket 21 (FIG. 3) is secured to the bottom wall 19 of the housing by means of rivets 22—22. The bracket includes an upraised arm 23 which support a bayonet type socket 24 in horizontal alignment beneath the lens 17. The socket contains a suitable bulb 25 that is centrally positioned beneath the lens. The electrical leads 12—12 for servicing the bulb are brought into the housing and are connected to the socket as illustrated in FIGS. 2 and 3. Depending on the function of the lamp either two or three leads are typically required. A three lead system is shown being utilized in the present embodiment of the invention.

A horizontal shelf 27 having a top surface 29 located inside the housing and a bottom surface 30 located outside the housing is positioned in one corner of the housing adjacent to the bulb socket 24. The shelf forms an integral part of the molded housing and has a thickness equal to that of the housing walls. The shelf creates a recess within the adjacent corner of the housing and is connected to the bottom wall 19 of the housing by an arcuate shaped wall 29 (FIG. 3). The bottom surface of the shelf forms the top wall of the recess 31. A series of conical shaped lead shields 35—35, equal in number to the number of leads being utilized, depend from the bottom of the shelf downwardly into the recessed region 31. A lead receiving hole 26 is passed upwardly through the shield and the co-joined shelf to provide electrical access into the housing. The shelf is positioned adjacent to the socket and leads 12—12 are passed upwardly through the holes into the housing where they are connected to the socket. The leads are further aligned within the recess and held in this protected region by the shields to prevent them from becoming frayed or otherwise damaged during installation and use.

The body of the housing is provided with a horizontally enlarged section, generally referenced 40, that extends about its entire outer periphery at the upper part thereof. The contour of the enlarged section complements the shape of the opening 13 formed in the body panel and includes a plurality of downwardly inclined vertical aligned ribs 37—37 that are equally spaced about the housing. The ribs blend into the side walls of the housing just below its midsection and combine to establish a ramp, generally referenced 41 (FIG. 1). The enlarged section of the housing is slightly larger than the size of the opening contained in the panel and provides an interference fit with the rim of the hole.

A first outside groove 49 is formed in the enlarged section of the housing a given distance from the top surface. The groove extends horizontally about the outer periphery of the housing. The groove is made sufficiently deep so that the rim of the opening can be easily accommodated therein. The dimension of the groove across the bottom wall 52 is also sufficiently wide so that panels of various thicknesses can be easily contained within the groove opening.

A protruded lip 55 is molded into the enlarged section of the housing, immediately over the outside groove. The bottom surface 56 of the lip forms the top side walls of the groove (FIG. 5). The lip is inclined downwardly toward the bottom wall of the housing so that its outer end 57 is normally positioned at or below the horizontal plane described by the opposing bottom wall 60 of the groove. The lip, when in a normal or non-deformed position, extends downwardly over the mouth of the groove.

To secure the housing within the panel, the bottom wall thereof is passed into the panel through the opening and the inclined ribs 37—37 are brought into contact with the rim of the opening. The housing is automatically aligned within the opening by ribs and with further closing pressure applied on the housing the enlarged section 40 is forced into the opening. The spaces between the ribs permit the ribs to deform sufficiently to facilitate entry of the enlarged section of the housing into the opening. The enlarged section is forced into the opening until such time as the rim of the opening becomes aligned in the groove 49 whereupon the panel snaps into the groove to lock the housing in place. The outside surface of the panel about the rim of the opening contacts the lower surface 56 of the lip 55 prior to the panel entering the groove and thus pushes the lip upwardly into the phantom line position as illustrated in FIG. 5. As a result the lip is strongly biased against the rim of the panel when it is snapped into the locked position thereby forming an extremely tight seal.

With further reference to FIG. 5 a second inside groove 60 is formed about the inner periphery of the housing within the top opening 61. The groove is in parallel alignment with the first outside groove 49 and is arranged to receive the end edge flange 63 of lens 17 therein. The inside groove is offset vertically above the outside groove a sufficient distance so that the top section of the housing can be independently deformed to allow the lens to be removed and replaced without having to remove the housing from the panel.

As can be seen through this construction the lens can be easily removed from the housing in the event it becomes damaged and a new lens snapped in its place. Similarly if the bulb enclosed in the housing becomes inoperative, the lens can be removed from the housing and the bulb replaced. It should be noted, because of the shock absorbing and self-sealing properties of the housing, the electrical components mounted in the housing are extremely well protected from both the weather and road induced damage thus providing for relatively long wear. As shown in FIG. 5, the top surface 65 of the lens 17 is recessed in assembly well below the top surface 50 of the housing. Accordingly, the lens is surrounded by a raised bumper rail 67 of deformable material that further protects the lens from direct impact.

Turning now to FIG. 7, at least one drain or weep hole 70 is formed in the raised bumper rail 67. The drain hole or holes are located at the lowest point along the rail where moisture formed on the lens will collect. The drain hole is large enough to prevent the collected moisture to drain freely from around the lens and be carried away from the housing.

While this invention has been described in detail with reference to a single preferred embodiment, it should be recognized that many modifications and variations thereof which might present themselves to persons skilled in the art, are within the scope of the invention as defined in the following claims.

We claim:

1. A shock resistant lamp that is capable of being snapped into locking contact with the rim of a receiving opening formed in a body panel of a vehicle that includes an open topped housing formed of a resilient material having a horizontal bottom wall and vertically disposed side walls, said housing having an expanded section about the side wall that compliments and is slightly larger than the opening in the body panel and having a first outer groove formed thereabout for accepting the rim of said panel opening therein, said outer groove being located a predetermined distance below the top surface of the housing, said housing further including a second inside groove formed about the inner periphery of the housing for containing a lens therein whereby the lens closes the housing, said second groove being positioned above the first groove a vertical distance that is sufficient so that the top of the housing can be deformed to release the lens without removing the housing from the panel, and illumination means secured to an inside wall of said housing beneath the lens.

2. The lamp of claim 1 wherein said housing further includes an outwardly disposed lip positioned over said first outside groove, said lip being inclined downwardly toward the bottom wall of the housing to at least partially close the entrance of said first outside groove whereby the lip is biased against the rim of the panel opening when the panel is locked in said first outside groove to form a seal thereagainst.

3. The lamp of claim 2 wherein the bottom surface of said lip is co-extensive with the top wall of the outside groove and normally extends downwardly over the front opening of the said outside groove.

4. The lamp of claim 1 wherein the expanded section of said housing is further joined to the side walls of the housing by means of a series of inclined ribs that slant downwardly and inwardly toward the bottom wall of the housing.

5. The lamp of claim 1 wherein the separation distance between the first and second grooves is greater than the wall thickness of the housing.

6. The lamp of claim 1 wherein the illumination means further includes a bracket means that is secured to the bottom wall of the housing for centrally supporting a bulb and socket unit beneath the lens.

7. The lamp of claim 1 wherein the outer surface of a lens seated in said second inside groove is below the top surface of the housing so that the housing forms a protective railing over the lens.

8. The housing of claim 6 wherein said housing further includes a horizontal shelf adjacent said socket, said shelf having holes formed therein which open to the outside of said housing beneath said outside groove through which electrical leads are passed into the housing.

9. The lamp of claim 8 that further includes hollow cylindrical lead shields depending downwardly from the shelf for encircling the leads entering the housing.

10. The lamp of claim 7 wherein the protective rail further contains at least one drain hole formed therein to permit moisture collected on the lens to drain away from the housing.

* * * * *